United States Patent
Candido De Lima Junior et al.

(10) Patent No.: US 11,222,490 B2
(45) Date of Patent: Jan. 11, 2022

(54) PHYSICAL MODIFICATION OF CIRCUITS FOR AUTOMOTIVE SECURITY

(71) Applicant: International Business Machines Corporation, Armonk, NY (US)

(72) Inventors: Juscelino Candido De Lima Junior, Campinas (BR); Breno H. Leitao, Araraquara (BR); Carlos Eduardo Seo, Sao Paulo (BR); Antonio Joao Schwartz Soares, Itatiba (BR)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 16/441,222

(22) Filed: Jun. 14, 2019

(65) Prior Publication Data

US 2020/0394852 A1  Dec. 17, 2020

(51) Int. Cl.
   *G07C 5/08*  (2006.01)
   *G01C 22/02*  (2006.01)

(52) U.S. Cl.
   CPC ............. *G07C 5/085* (2013.01); *G01C 22/02* (2013.01); *G07C 5/0816* (2013.01); *B60Y 2200/11* (2013.01)

(58) Field of Classification Search
   None
   See application file for complete search history.

(56) References Cited

U.S. PATENT DOCUMENTS

| | | | | |
|---|---|---|---|---|
| 9,910,659 B2 * | 3/2018 | Krishnamurthy | ......... | G06F 8/65 |
| 10,061,927 B2 * | 8/2018 | Murakami | ............ | G06F 21/572 |
| 10,579,348 B2 * | 3/2020 | Chiang | ................. | G06F 3/0658 |
| 10,896,033 B2 * | 1/2021 | Cariello | ................. | G11C 16/26 |
| 2008/0189006 A1 | 8/2008 | Meehan et al. | | |
| 2012/0158356 A1 | 6/2012 | Prochaska et al. | | |
| 2018/0190043 A1 | 7/2018 | Dominic | | |
| 2020/0034572 A1 * | 1/2020 | Mundra | .................. | H04L 9/004 |

FOREIGN PATENT DOCUMENTS

CN    104978534 A    10/2015

OTHER PUBLICATIONS

Nilsson et al., "Secure Firmware Updates over the Air in Intelligent Vehicles", 2008 IEEE International Conference on Communications Workshops, May 2008, pp. 380-384. (Year: 2008).*

(Continued)

*Primary Examiner* — Todd Melton
(74) *Attorney, Agent, or Firm* — Nolan M. Lawrence

(57) ABSTRACT

A service request for an automobile is detected. The service request includes a service version number. A first integrated circuit of the automobile is verified. The verification of the first integrated circuit is in response to detecting the service request. A component version number of the first integrated circuit is determined in response to verifying the first integrated circuit. The service version number is compared to the component version number of the first integrated circuit. The comparison is based on the determining the component version number. A service operation regarding the automobile is performed. The service operation is performed based on the comparing the service version number to the component version number.

20 Claims, 4 Drawing Sheets

(56) References Cited

OTHER PUBLICATIONS

Preston, "Odometer Tampering, a Crime of the Past, Leaps into the Future", Car and Driver, Jun. 29, 2018, 6 pages, https://www.caranddriver.com/features/a21946562/odometer-tampering-a-crime-of-the-past-leaps-into-the-future/#backfires.

"Is it possible to "roll back the odometer" in modern cars?", Quora, printed Mar. 19, 2019, 3 pages, https://www.quora.com/Is-it-possible-to-roll-back-the-odometer-in-modern-cars.

Lambiet, "Exclusive: Ferrari fesses up! Luxury car company KNEW dealers were using devices to roll back odometers of used sports cars to pump up resale value and puts the brakes on the practice, court docs reveal", DailyMail.com, News, Published Feb. 27, 2018, https://www.dailymail.co.uk/news/article-5437837/Ferrari-fesses-dealers-changing-odometers.html, 40 pages.

De Caro, "How the Nintendo Switch prevents downgrades by irreparably blowing its own fuses", Hackernoon, Apr. 26, 2018, https://hackemoon.com/how-the-nintendo-switch-prevents-downgrades-by-irreparably-blowing-its-own-fuses-884bd3b7a8ba, 4 pages.

"Fuses", Nintendo Switch Brew, printed Jun. 12, 2019, 21 pages. https://switchbrew.org/w/index.php?title=Fuses#Anti-downgrade.

\* cited by examiner

PHYSICAL MODIFICATION OF CIRCUITS FOR AUTOMOTIVE SECURITY

BACKGROUND

The present disclosure relates to automotive security, and more specifically, to detecting an automobile has been tampered with and preventing automobile tampering.

Automobiles (motor vehicles) have become an essential part of life in many societies. For instance, many populations in the may rely upon cars to commute to work. In other instances, people may use cars to transport family to school and activities. Automobiles have also become used for communicating status and for wealth building. For instance, automobiles may be purchased as an investment. In some instances, automobiles may be purchased to communicate interest in hobbies such as motorsports or automotive history.

SUMMARY

A method, system, and computer program product is disclosed according to some embodiments of the present disclosure. A service request for an automobile is detected. The service request includes a service version number. A first integrated circuit of the automobile is verified. The verification of the first integrated circuit is in response to detecting the service request. A component version number of the first integrated circuit is determined in response to verifying the first integrated circuit. The service version number is compared to the component version number of the first integrated circuit. The comparison is based on the determining the component version number. A service operation regarding the automobile is performed. The service operation is performed based on the comparing the service version number to the component version number.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
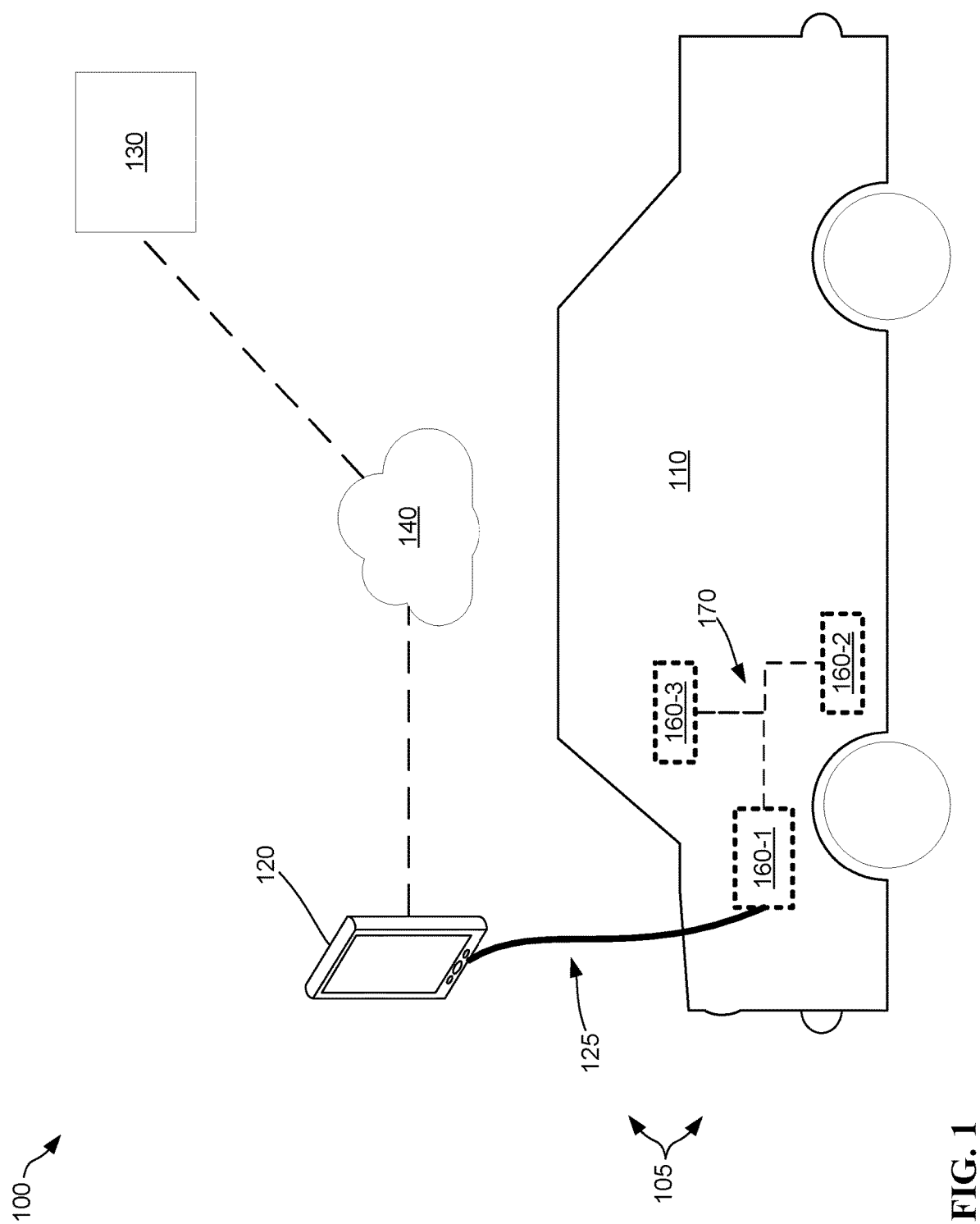
FIG. 1 depicts an example system for implementing tamper resistance in an automotive environment, consistent with some embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automotive security, and more particular aspects relate to detecting an automobile has been tampered with and preventing automobile tampering. While the present disclosure is not necessarily limited to such applications, various aspects of the disclosure may be appreciated through a discussion of various examples using this context.

For many individuals, an automobile may be one of, if not the most expensive purchase they make. While automotive technology has increased, so have the costs associated with automobiles. For instance, safety regulations have led to automobile manufacturers building automobiles with numerous costly safety features, such as airbags and sophisticated driver aides. Further, efficiency concerns have led to increasingly sophisticated and expensive drivetrains as well. For example, emissions have been reduced by providing sophisticated ignition and fuel control. Additionally, advanced multispeed transmissions require sophisticated drivetrain control electronics.

With added complexity, automobiles have increasing service and maintenance costs. For example, cars may have spark plugs, belts, wires, clutches, pulleys, or other components or subsystems that are scheduled for routine maintenance by the manufacturer of the vehicle. Certain automobiles (e.g., high performance automobiles) require significant and costly service be performed to maintain various components. For example, some high-performance vehicles may require the engine to be removed to successfully perform a belt change.

Further, automobiles are often valued based on the usage. For example, most automobiles are installed with odometers. Odometers track the distance that an automobile has been driven (also referred to herein as mileage). A particular make and model of automobile may be worth significantly more or less depending on the mileage. For example, a given make and model automobile that has been driven 23,000 miles may be worth half the value of another automobile of the same make and model that has been driven 5,700 miles.

To try and obtain an inaccurate valuation for the sale of used automobiles, some bad actors have altered the odometer to create a false reading (alternatively, tampering). A used automobile that has been tampered with may cause significant losses to customers that purchase used vehicles. In addition to the paying more than the actual value of the automobile, the customer may be hit with unexpected expenses due to the additional wear on the automobile or following an incorrect maintenance schedule based on the incorrect mileage.

For example, a car may be purchased for $30,000 with 20,000 miles on the odometer. The car should have a service operation (service) performed at 22,000 miles that costs $2,200 at a professional automobile mechanic shop. The car has been tampered with and has actually been driven 30,000 miles. If the car is damaged because the $2,200 service is not performed, then a replacement of damaged components costs over $15,000.

In another example, a new exotic car may be purchased for $180,000 because the odometer has less than 5,000 kilometers on it. The exotic car has been tampered with and has been driven over 10,000 kilometers. A valuation of similar exotic cars having over 10,000 kilometers is around $145,000.

To prevent tampering with automobiles, some manufacturers have replaced mechanical odometers with electronic odometers. In some instances, however, modern automobile odometers have become easier to tamper with or otherwise alter. For example, many cars have a diagnostics port that permits communicative coupling with a computing device or other diagnostics tool. Devices compatible with connecting to the electronic control units of automobiles have become more inexpensive, which may increase the ease with which automotive tampering occurs.

Other attempts to prevent tampering with automobiles have included connecting automotive control units of a vehicle to remote servers for periodic verification. For example, a given automobile may be configured to connect to a wireless network for communication over the Internet. The given automobile may be configured to periodically attempt to send information related to the automobile including the odometer reading. This has a couple of drawbacks. First, adding the ability to make a wireless connection to an automobile may be costly. Second, a wireless connection may not be continuously available due to, for example, losing coverage for network connectivity based on the geographic location that a vehicle is being driven. Third, bad actors may intercept and alter the signals being sent to remote servers.

An electronic control unit with a physically modifiable internal component (PMIC) may provide benefits over existing security techniques. A PMIC may be incorporated inside an electronic control unit (ECU), a computer, or another module of a car. In some embodiments, the PMIC may be implemented using eFUSE, which is a technology for the dynamic real-time reprogramming of computer chips. eFUSE has the benefit of once a "fuse" is burned, it can't be restored to its original state. A non-limiting list of ECUs that may be configured with a PMIC include the following: engine control module, a powertrain control module, a transmission control module, a brake control module, a central control module, a body control module, fuel pump control module, or a suspension control module. Other componentry of an automobile may include circuitry related to or connected with an ECU. For example, PMIC may be internally integrated into any of the following: engine wiring harness, chassis harness, throttle position sensor, ground jumper, oxygen sensors, charge air temperature sensors, or controller area network (CAN) bus interface device.

A PMIC may be comprised of one or more breakable devices configured to cause an open circuit (e.g., a fuse, a wire, a conductive material with a defined brittleness). Each of the breakable devices may operate through a sacrificial operation, such as breaking. Before being broken, each breakable device may be an electronic pathway through which current may flow from one end to another. Electricity may flow through continuously or in response to a request to verify the breakable device. If electricity reaches another end, the circuit is considered closed and the closed circuit may represent a value, such as a '1' or a '0'. After being broken, each breakable device may be broken such that current may no longer flow from one end to another. For example, the breakable device may be constructed of a fragile nature that severs or vaporizes in response to heat, current, or other relevant cause. If electricity does not reach another end, the circuit is considered open and the open circuit may represent a value, such as a '0' or a '1'. As described, breaking may include any of the following: vaporizing, melting, burning, blowing, rupturing, physically modifying, or otherwise disrupting the flow of current. Each of the breakable devices may operate by receiving an electrical current that causes the creation of the open circuit (e.g., an overcurrent, an excessive load).

The PMIC may effectuate operation directly. For example, the PMIC may include logic that reads the number breakable devices and their current state. In some embodiments, the logic may not be included in the PMIC. For example, the logic may be within a sensor or computer housing the PMIC. In another example, the logic may be in a second integrated circuit and may be communicatively coupled to the PMIC through logical traces of a circuit board or through a communication cable or other wire. The PMIC may operate by applying a current directly to a breakable device, such as a current through a breakable device. The PMIC may operate by applying a current indirectly to a breakable device and applying a second current directly to the breakable device. In a first example, a first current is applied to a wire adjacent to a plurality of breakable devices causing the breakable devices to increase in temperature (e.g., heating). After heating, a second current is applied directly to one or more of the plurality of breakable devices causing one or more breakable devices to break, and consequently, creating one or more permanently open circuits.

By incorporating a PMIC, an irreversible or permanent signature may be created relating to the status of an automobile. The irreversible signature may be related to or tied to the usage of the vehicle, such as the mileage or distance that the vehicle has traveled (e.g., odometer). The irreversible signature may be related to the service of the vehicle, such as performing maintenance or replacing worn parts. The irreversible signature may correspond to the one or more breakable devices of the PMIC. For example, a PMIC containing 250 breakable fuses may be configured to break a breakable fuse every 1,000 miles traveled on the odometer.

FIG. 1 depicts an example system 100 for implementing tamper resistance in an automotive environment, consistent with some embodiments of the disclosure. System 100 may include an automobile 110, a device 120, a server 130, and a network 140 communicatively coupling various components of the system. The automobile 110 and the device 120 may be located at a service location 105, such as an automobile dealership.

Device 120 may be an electronic device configured to perform diagnostics on automobile 110. Device 120 may be solely configured to perform diagnostics on automobiles. For example, device 120 may be a diagnostics scanner configured to access and interface with a computer or other ECU of an automobile and configured to alter or update service, maintenance, and diagnostics settings. Device 120 may be a general function device that includes diagnostic software. For example, device 120 may be a tablet computer or smartphone including a diagnostic app downloaded from an app store.

Device 120 may include a diagnostic connection 125 configured to communicatively couple to automobile 110. Diagnostic connection 125 may be a wired connection such as a diagnostic cable configured to connect to an ECU through a diagnostic port (e.g., a sixteen-pin on-board diagnostics connector, an assembly line diagnostic link). Diagnostic connection 125 may be a wireless connection, such as a wireless or infrared connection to an automobile. Device 120 may be connected to a server 130 by network 140. Network 140 may be a local area network. Network 140 may be a wide area network such as the Internet. Server 130 may be owned or maintained by a manufacturer such as a manufacturer of automobile 110. Server 130 may include one or more servers and a datastore for storing records regarding automobiles, such as automobile 110.

Automobile 110 may include one or more integrated circuits 160-1, 160-2, 160-3 (collectively, 160) and an automotive network 170. Automotive network 170 may communicatively couple components of the automobile 110 as well as the integrated circuits 160. Automotive network 170 may be a bus, such as a CAN bus. Integrated circuits 160 may be computers, sensors, or other electronic modules of an automobile. In a first example, integrated circuit 160-1 is a central computer of automobile 110 and includes a diagnostics port (not depicted) for receiving diagnostic connection 125. Integrated circuit 160-1 may be configured to control and communicate with other major components of automobile 110, such as an engine control unit (not depicted) and a transmission control unit (not depicted). In a second example, integrated circuit 160-2 is a seat sensor configured to sense the presence of a passenger within automobile 110 and communicates along automotive network 170 with integrated circuit 160-1. In a third example, integrated circuit 160-3 is an instrument panel cluster configured to display speed, engine revolutions per minute, distance driven and is configured to communication with integrated circuit 160-1 along automotive network 170.

The integrated circuits 160 are each configured with physically modifiable internal components (PMIC). In a first example, integrated circuit 160-1 includes a first PMIC (not depicted). The first PMIC may include a plurality of closed circuits (not depicted), and each closed circuit of the plurality are irrevocably modifiable such that they become an open circuit. In response to an increase in distance driven by automobile 110, the first PMIC may cause one or more closed circuits of the plurality to become open circuits. Causing one or more closed circuits of the plurality to become open circuits may include blowing, breaking, vaporizing, overloading with a current, or any other form of physical modification that destroys the closed circuit. Integrated circuit 160-1 may cause one or more closed circuits of the plurality of closed circuits of the first PMIC to become open in response to a service being performed.

In some embodiments, a service being performed may be a routine service. For example, inside of automobile 110 integrated circuit 160-1 may be an engine control module, integrated circuit 160-2 may be a transmission control module, and integrated circuit 160-3 may be a navigation and display computer. Integrated circuit 160-3 may communicate a need for an oil change of automobile 110 (e.g., causing a 10,000 mile oil change to display). Based on automobile 110 detecting a service request (e.g., connection of device 120 by way of diagnostic connection 125) integrated circuit 160-1 may responsively verify the first PMIC. Verification of first PMIC of integrated circuit 160-1 may include determining the number of open circuits (e.g., counting the number open circuits or counting the number of closed circuits and subtracting the number of closed circuits from the total number of modifiable circuits). Integrated circuit 160-1 may compare the number of open circuits to a count related to the service request from device 120 (e.g., device 120 may be attempting to perform a removal of 10,000 mile oil change on the display). The service request from device 120 may include a service version number stored on device 120 or obtained from a manufacturer (e.g., from remote location 130 through network 140). If the service version number does not match the corresponding count of open circuits, integrated circuit 160-1 may cause first PMIC to open additional circuits to match the service version number.

In some embodiments, verification may include comparing the number of open circuits in integrated circuit 160-1 with the number of open circuits in integrated circuit 160-2, or the number of open circuits in integrated 160-3. If one of the integrated circuits 160 has a PMIC with a lower number of open circuits, then as part of performing verification, the number of open circuits will be increased in the given integrated circuit 160 that is lower than the others. In a first example, if integrated circuit 160-3 is a digital odometer configured with a third PMIC designed to open an additional circuit every 1,000 miles of driving. Through automotive network 170 integrated circuit 160-3 communicates that an additional circuit is now open to integrated circuits 160-1 and 160-2. Responsively, integrated circuit 160-1 opens an additional circuit in the first PMIC and integrated circuit 160-2 opens an additional circuit in a second PMIC. This ensures that all integrated circuits 160 in automobile 110 are the same.

If odometer 160-3 is replaced with a new odometer 160-3 and electrically connected to automobile 110, the number of open circuits in new odometer 160-3 may be lower than the rest of the integrated circuits 160-2 and 160-1 in automobile 110. The new odometer 160-3, as part of detecting electricity, may cause a number of open circuits in integrated circuits 160-1 and 160-2 to be communicated through automotive network 170. For example, new odometer 160-3 may, upon being supplied with electricity, communicate with other components of the automobile 110 to request a status of the automobile and the other components. The other components (e.g., integrated circuit 160-2, integrated circuit 160-1) may communicate their configuration including their number of open circuits. Further, new odometer 160-3 may open additional circuits to ensure that even though the odometer was replaced, the mileage reading of automobile 110 cannot be lowered. In some embodiments, integrated circuits 160 may each continually communicate to with each other and synchronize the number of open circuits (e.g., starting the engine automobile 110, receiving electrical power, every five seconds).

Figure 2:
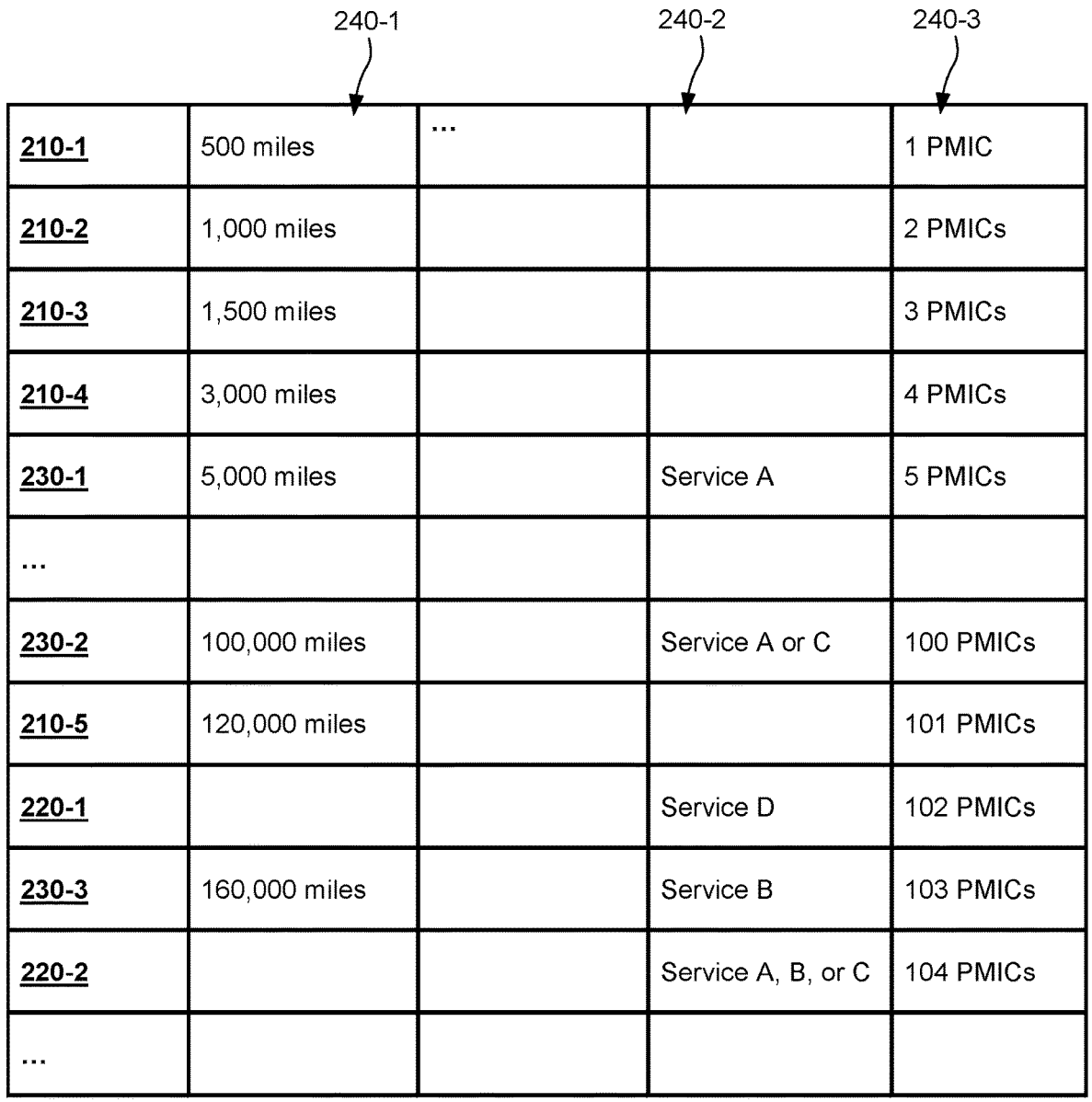
FIG. 2 depicts an example table representing stored values for implementing tamper resistance in an automotive environment, consistent with some embodiments of the disclosure.

FIG. 2 depicts an example table 200 representing stored values for implementing tamper resistance in an automotive environment, consistent with some embodiments of the disclosure. Table 200 may be embodied as a memory within an integrated circuit. Table 200 may be embedded into an electrical control unit of an automobile, such as a stability control module. Table 200 may be in a read-only memory (ROM), such as a non-editable firmware chip or mask ROM. Table 200 may be accessed by a PMIC or other electronic device with entirely internal, one-way modifiable components or circuitry. A PMIC may include a read-only memory with table 200. A PMIC may, based upon table 200, alter or otherwise modify itself based on the data located within table 200. For example, upon a number of open circuits listed within a given entry of table 200, PMIC may irrevocably open one or more circuits.

Table 200 includes a plurality of usage entries 210, service entries 220, and combination entries 230. Each entry within table 200 may communicate information regarding usage (column 240-1) and service (column 240-2) related to an automobile. Each entry within table 200 may also include a corresponding number of physically modifiable integrated circuits (column 240-3) that should be open. The number of physically modifiable integrated circuits may embody a component version number of a component of an automobile. For example, a component version number may be embodied by a number of open circuits in a central computer or a number of open circuits in a sensor. In some embodiments, there may be a homogenous arrangement of entries in table 200. For example, there may be an entry corresponding to each 1,000 miles driven. In some embodiments, there may be a heterogenous arrangement of entries in table 200. For example, there may be many entries corresponding to small amounts of kilometers driven from 0-50,000 kilometers. There may be fewer entries corresponding to larger amounts of kilometers driven from 50,000-100,000 kilometers driven. The heterogenous arrangement may correspond to the valuation of the automobile based on usage that is more granular from 0-50,000 kilometers than from 50,000-100,000 kilometers.

Usage entries 210 may correspond to an amount of usage of an automobile. For example, usage entry 210-3 may correspond to a vehicle that has reached 1,500 miles 240-1 and may communicate that three PMICs 240-3 should be open. Service entries 220 may correspond to a particular service to be performed on an automobile. For example, service entry 220-1 may indicate that if a timing belt 240-2 is replaced, that 102 PMICs 240-3 should be open. Combination entries 230 may correspond to a certain number of PMICs 240-3 that should be open if a particular usage is reached or if a particular service has been performed. In a first example, combination entry 230-1 indicates if a vehicle has driven 5,000 miles 240-1, or if an oil change (e.g., Service A) is performed 240-2 that five PMICs should be open 240-3.

Figure 3:
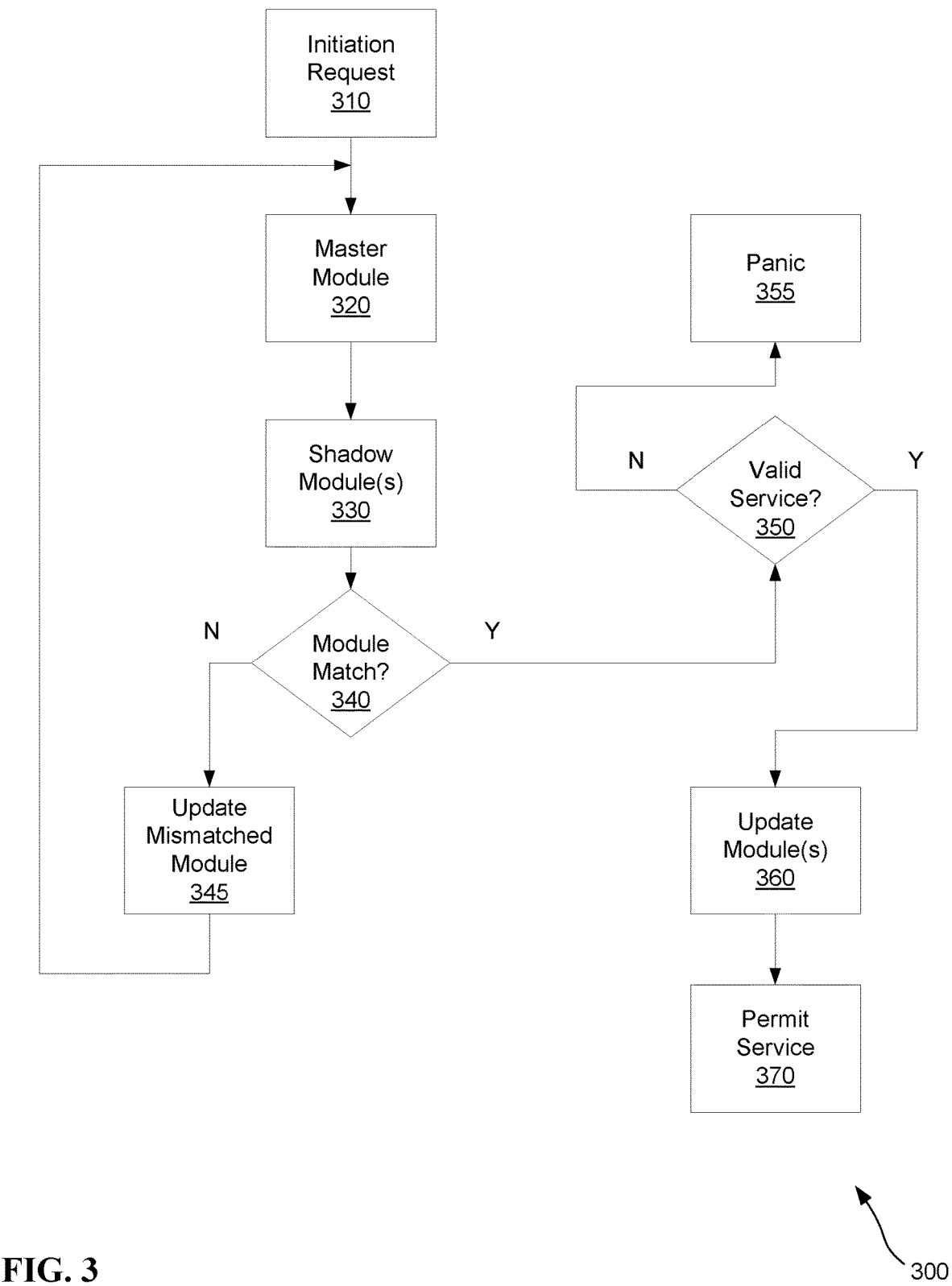
FIG. 3 depicts an example method of an integrated circuit performing one or more taper resistance measures, consistent with some embodiments of the disclosure.
Figure 4:
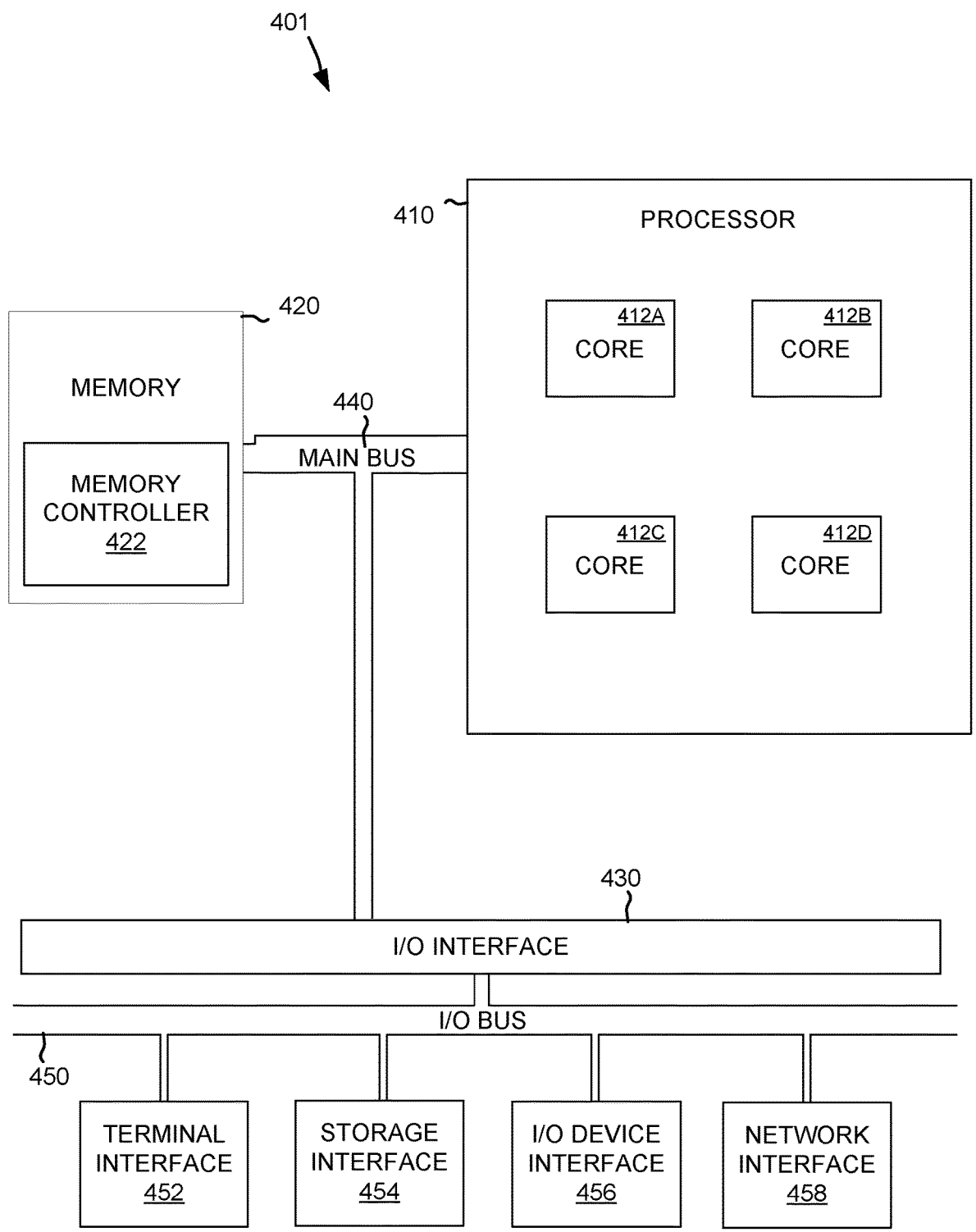
FIG. 4 depicts the representative major components of an example computer system that may be used, in accordance with some embodiments of the present disclosure.

FIG. 3 depicts an example method 300 of an integrated circuit performing one or more tamper resistance measures, consistent with some embodiments of the disclosure. Method 300 may be performed by a single electronic control unit of an automobile, for example a central computer. Method 300 may be performed by a plurality of electronic control units of an automobile. For example, certain operations may be performed by a transmission control module, and other operations may be performed by an engine control module. FIG. 4 depicts an example computer system that may comprise a portion of an electronic control unit consistent with some embodiments of the disclosure. Method 300 may be performed continuously (e.g., every second, every 16.67 milliseconds).

Method 300 begins when an initiation request is detected at 310. An initiation request may be detected, at 310, by a change in state of an automobile. For example, a change in state may be an engine of an automobile being started. In another example, a change in state may be a door of an automobile being unlocked.

An initiation request may be detected, at 310, by receiving a service request. The service request may be received from an automobile component, such as a computer requesting an oil change by displaying the request on an instrument panel of the automobile. The service request may be received from outside of an automobile, such as a technician plugging a port scanner into an ECU of the automobile. The initiation request, detected at 310, may include a service version number. For example, an automobile may need a spark plug replacement, and a computer of the automobile may indicate that the automobile should have thirty-five breakable circuits open after performance of a spark plug replacement. A service version number of the received request may, correspondingly, be thirty-five.

A master module of the automobile may be verified at 320. A master module may be a first module of the automobile, such as an electronic control unit. Master module may be any of a sensor or other electrical module of the automobile that contains physically modifiable integrated circuits (PMICs). Verification, at 320, may include counting the total number of PMICs of the master module. Verification, at 320, may include counting the number of open circuits of master module. The PMIC may embody a component version number as the number of open circuits. For example, a component version number may correspond to the mileage of the vehicle and may be related to the number of open circuits. A shadow module of the automobile may be verified at 330. Shadow module may be any of a second sensor or second other electrical module of the automobile that contains a second physically modifiable integrated circuits (PMICs). Verification, at 330, may include counting the total number of second PMICs of shadow module. Verification, at 330, may include counting the number of open circuits of shadow module. In some embodiments, verification at 330, may include verification of multiple second modules.

If the number of open circuits verified at 320 does not match the number of open circuits verified at 330, at 340, then any mismatched module may be updated at 345. Updating of a mismatched module, at 345, may include causing additional closed circuits of a given PMIC to become open (e.g., vaporizing, over loading). Updating of a mismatched module, at 345, may include causing additional open circuits on a module with fewer open circuits. For example, master module may have fewer open circuits than a first shadow module, and updating mismatched module, at 345, may include opening additional circuits on the master module. For example, a third shadow module may have fewer open circuits than a master module and updating mismatched module, at 345, may include opening additional circuits on the third shadow module. After updating any mismatched modules, at 345, method 300 continues by again verifying the master module at 320.

If the number of open circuits verified at 320 does match the number of open circuits verified at 330, at 340, then it may be determined if the service request is valid at 350. Determining if the service request is valid at 350, may include determining if there is a discrepancy in the expected service version number and the received service version number. Determining if the service request is valid at 350, may include comparing the service version number, detected at 310, is the same as the number of open circuits of one or more PMICs of an automobile. Determining if the service request is valid at 350, may include comparing the service version number, detected at 310, is the same as the number of open circuits of a PMIC after performance of the service. As discussed, "the same" may include that the count of open circuits of various integrated circuits is equal or that there is no difference between two integrated circuits. For example, an automobile may have twenty open circuits, and after a timing belt is changed the PMIC should have twenty-one open circuits. Determining, at 310, may include verifying that the service request includes a service verification number of twenty-one.

If the service request is valid, at 350, then modules of the automobile may be updated at 360. In some embodiments, only two modules (e.g., a master module in an instrument panel computer, and a shadow module in a central computer) of automobile may be updated, at 360. In some embodiments more than two modules may be updated. For example, updating a master module in an engine control unit, a first shadow module in a transmission control unit, and a second shadow module in a stability control sensor. Updating of a module of the automobile, at 360, may include opening one or more circuits of PMICs contained wholly within electronic control units of the automobile. After updating of any modules of the automobile, at 360, service of the vehicle may be permitted at 370. Permitting service to be performed, at 370, may include resetting any service warnings of the automobile. For example, resetting a check engine light of the automobile, may be permitted at 370. If the service request is not valid, at 350, then the automobile may enter a panic state at 355. The panic state at 355 may include ignoring the request to perform service, detected at 310. The panic state at 355 may include communicating that an error has occurred in performing the service. The panic state at 355 may include transmitting an identifier related to or of the automobile, such as a vehicle identification number.

The panic state at 355 may include recording the discrepancy and communicating the discrepancy at a later time. For example, a requested to perform service may be received from a third-party mechanic attempting to reset the check engine light on an automobile with a modified traction control unit. The automobile may include a computer configured to perform method 300. In response to the received service version number having a discrepancy from the expected service version number, the computer may record the timestamp of the third-party mechanic's attempts to reset the check engine light, as well the service version number. Later, the modified automobile may be brought to a dealership and communicatively connected to a dealership computer. Upon connection to a dealership computer, the computer of the automobile may provide that the automobile determined a discrepancy as well as the attempt to clear the check engine light.

FIG. 4 depicts the representative major components of an example computer system 401 that may be used, in accordance with some embodiments of the present disclosure. It is appreciated that individual components may vary in complexity, number, type, and/or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or more methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a service request for an automobile, the service request including a service version number;
   verifying, in response to the detecting the service request, a first integrated circuit of the automobile, wherein the verifying the first integrated circuit includes determining one or more electronic pathways in the first integrated circuit are broken;
   determining, in response to the verifying the first integrated circuit, a component version number of the first integrated circuit;
   comparing, based on the determining the component version number, the service version number to the component version number of the first integrated circuit; and
   performing, based on the comparing the service version number to the component version number, a service operation regarding the automobile.

2. The method of claim 1, wherein the verifying the first integrated circuit comprises:
   counting a first one or more permanently open circuits of the first integrated circuit of the automobile;
   counting a second one or more permanently open circuits of a second integrated circuit of the automobile;
   comparing the first one or more permanently open circuits and the second one or more permanently open circuits; and performing, based on the comparing the first one or more permanently open circuits and the second one or more permanently open circuits, a verification operation on the first integrated circuit.

3. The method of claim 2, wherein the count of the first one or more permanently open circuits is equal to the count of the second one or more permanently open circuits, wherein the performing the verification operation on the first integrated circuit comprises:
generating a verified status, the verified status including the component version number of the first integrated circuit.

4. The method of claim 2, wherein the count of the first one or more permanently open circuits is less than the count of the second one or more permanently open circuits, and wherein the performing the verification operation on the first integrated circuit comprises:
causing a number of closed circuits of the first integrated circuit to permanently open, wherein the number of closed circuits is equal to the difference between the second one or more permanently open circuits and the first one or more permanently open circuits.

5. The method of claim 4, wherein the performing the verification operation on the first integrated circuit further comprises:
generating a verified status, the verified status including the component version number of the first integrated circuit.

6. The method of claim 5, wherein the verified status further includes the difference between the second one or more permanently open circuits and the first one or more permanently open circuits.

7. The method of claim 2, wherein the count of the first one or more permanently open circuits is more than the count of the second one or more permanently open circuits, and wherein the performing the verification operation on the first integrated circuit comprises:
causing a number of closed circuits of the second integrated circuit to permanently open, wherein the number of closed circuits is equal to the difference between the first one or more permanently open circuits and the second one or more permanently open circuits.

8. The method of claim 1, wherein the component version number is tied to the odometer reading of the automobile.

9. The method of claim 1, wherein comparing the service version number to the component version number of the first integrated circuit comprises:
determining a discrepancy between the service version number and the component version number.

10. The method of claim 9, wherein performing the service operation comprises:
ignoring, based on the determining the discrepancy, a request to clear a service code related to the service request.

11. The method of claim 9, wherein the automobile has an identifier, and wherein performing the service operation comprises:
transmitting, based on the determining the discrepancy, the identifier of the automobile to a manufacturer of the automobile;
comparing, based on the determining the component version number, the service version number to the component version number of the first integrated circuit; and
performing, based on the comparing the service version number to the component version number, the service operation regarding the automobile.

12. The method of claim 1, wherein the first integrated circuit is located inside of an electronic control unit of the automobile.

13. The method of claim 12, wherein the electronic control unit is selected from the group consisting of an engine control module, a powertrain control module, a transmission control module, a brake control module, a central control module, a body control module, and a suspension control module.

14. A system, the system comprising:
a memory, the memory containing one or more instructions; and
a processor, the processor communicatively coupled to the memory, the processor, in response to reading the one or more instructions, configured to:
detect a service request for an automobile, the service request including a service version number;
verify, in response to the detecting the service request, a first integrated circuit of the automobile, wherein the verifying the first integrated circuit includes determining one or more electronic pathways in the first integrated circuit are broken;
determine, in response to the verifying the first integrated circuit, a component version number of the first integrated circuit;
compare, based on the determining the component version number, the service version number to the component version number of the first integrated circuit; and
perform, based on the comparing the service version number to the component version number, a service operation regarding the automobile.

15. The system of claim 14, wherein the first integrated circuit is located inside of an electronic control unit of the automobile.

16. The system of claim 15, wherein the electronic control unit is selected from the group consisting of an engine control module, a powertrain control module, a transmission control module, a brake control module, a central control module, a body control module, and a suspension control module.

17. A computer program product, the computer program product comprising a computer readable storage medium having program instructions embodied therewith, the program instructions configured to:
detect a service request for an automobile, the service request including a service version number;
verify, in response to the detecting the service request, a first integrated circuit of the automobile, wherein the verifying the first integrated circuit includes determining an amount of electronic pathways in the first integrated circuit are broken;
determine, in response to the verifying the first integrated circuit, a component version number of the first integrated circuit;
compare, based on the determining the component version number, the service version number to the component version number of the first integrated circuit; and
perform, based on the comparing the service version number to the component version number, a service operation regarding the automobile.

18. The computer program product of claim 17, wherein the verify the first integrated circuit comprises:
counting a first one or more permanently open circuits of the first integrated circuit of the automobile;

counting a second one or more permanently open circuits of a second integrated circuit of the automobile;

comparing the first one or more permanently open circuits and the second one or more permanently open circuits; and performing, based on the comparing the first one or more permanently open circuits and the second one or more permanently open circuits, a verification operation on the first integrated circuit.

19. The computer program product of claim 18, wherein the count of the first one or more permanently open circuits is equal to the count of the second one or more permanently open circuits, wherein the performing the verification operation on the first integrated circuit comprises:

generating a verified status, the verified status including the component version number of the first integrated circuit.

20. The computer program product of claim 18, wherein the count of the first one or more permanently open circuits is less than the count of the second one or more permanently open circuits, and wherein the performing the verification operation on the first integrated circuit comprises:

causing a number of closed circuits of the first integrated circuit to permanently open, wherein the number of closed circuits is equal to the difference between the second one or more permanently open circuits and the first one or more permanently open circuits.

* * * * *